United States Patent
Furlong et al.

(10) Patent No.: US 6,727,689 B1
(45) Date of Patent: Apr. 27, 2004

(54) MAGNETIC-EFFECT SENSING APPARATUS WITH SIGNAL THRESHOLDING

(75) Inventors: Greg R. Furlong, Freeport, IL (US); Joel D. Stolfus, Freeport, IL (US); Jason M. Chilcote, Frisco, TX (US); Scott L. Bunyer, Freeport, IL (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/631,850

(22) Filed: Jul. 24, 2003

(51) Int. Cl.[7] .............................. G01P 3/489; G01B 7/30
(52) U.S. Cl. ..................... 324/207.25; 324/166; 327/60
(58) Field of Search ....................... 324/207.12, 207.13, 324/207.14, 207.15, 207.16, 207.17, 207.2, 207.21, 207.22, 207.24, 207.25, 207.26, 166, 173, 174, 178; 338/32 R, 32 H; 360/60, 68, 72, 510, 511, 37, 87

(56) References Cited

U.S. PATENT DOCUMENTS

| | | | | | |
|---|---|---|---|---|---|
| 5,140,262 A | * | 8/1992 | Stolfus | ..................... | 324/207.2 |
| 5,304,926 A | * | 4/1994 | Wu | ......................... | 324/207.2 |
| 5,414,355 A | * | 5/1995 | Davidson et al. | ........ | 324/207.2 |
| 5,455,510 A | * | 10/1995 | Nelson | ........................ | 324/252 |
| 5,493,219 A | * | 2/1996 | Makino et al. | ........ | 324/207.25 |
| 5,497,084 A | * | 3/1996 | Bicking | .................. | 324/207.25 |
| 5,500,589 A | * | 3/1996 | Sumcad | ..................... | 324/202 |
| 5,650,719 A | * | 7/1997 | Moody et al. | .............. | 324/166 |
| 5,694,038 A | * | 12/1997 | Moody et al. | ............ | 324/207.2 |
| 5,694,040 A | * | 12/1997 | Plagens | .................... | 324/207.2 |
| 5,729,128 A | * | 3/1998 | Bunyer et al. | .............. | 324/202 |
| 5,867,021 A | * | 2/1999 | Hancock | ................... | 324/207.2 |
| 6,181,127 B1 | * | 1/2001 | Wallrafen | ................... | 324/166 |
| 6,191,576 B1 | * | 2/2001 | Ricks et al. | ............. | 324/207.2 |
| 6,211,670 B1 | * | 4/2001 | DeWilde et al. | ........ | 324/207.21 |
| 6,232,832 B1 | * | 5/2001 | Kirkpatrick, II | ............ | 327/560 |
| 6,404,168 B1 | * | 6/2002 | Shoji | .......................... | 320/134 |

* cited by examiner

Primary Examiner—Jay Patidar
(74) Attorney, Agent, or Firm—Kris T. Fredrick

(57) ABSTRACT

An apparatus and method for detecting gear features is provided. The apparatus includes a magnetic-sensing element, a thresholding module, and an output module. The magnetic-sensing element may provide a sensor-output signal indicative of the presence of a gear feature.

The thresholding module may (i) transform the sensor-output signal into a characteristic waveform, which is also indicative of the presence of the gear feature; (ii) detect a first difference between the characteristic waveform and a reference signal, and responsively provide a tracking signal that tracks this difference; and (iii) detect a second difference between the tracking and reference signals, and responsively adjust the sensor-output signal.

Adjustment may be performed (i) as a function of the second difference when it falls below a given threshold and (ii) by a predetermined amount when the second difference satisfies the given threshold. The output module may produce an output signal as a function of the characteristic waveform and the reference signals.

25 Claims, 7 Drawing Sheets

MAGNETIC-EFFECT SENSING APPARATUS WITH SIGNAL THRESHOLDING

TECHNICAL FIELD

The following relates generally to position sensors and/or sensing, and more particularly, to an apparatus and method for sensing gear features, such as gear teeth and/or gear slots. The following also relates to magnetic effect sensing apparatuses including linear position sensing as well as the commonly known rotary position "geartooth sensors" that have a magnetically sensitive device for sensing ferrous objects or objects generally projecting from a rotating target and resembling the teeth of a gear. The apparatus and method is particularly useful for providing an efficient, portable, reliable, and extensible camshaft and/or crankshaft geartooth sensors.

BACKGROUND

Various sensors are known in the magnetic-effect sensing arts. Examples of common magnetic-effect sensors may include Hall effect and magnetoresistive technologies. Generally, these magnetic-effect sensors will respond to the change of magnetic field as influenced by the presence or absence of a ferromagnetic target object of a designed shape that passes through or by the sensory field of the magnetic-effect sensor.

When acting as a transducer, the magnetic-effect sensor generally outputs an electrical signal representative of the sensed magnetic field. The electrical signal can vary in amplitude and width so as to correspond to the shape, e.g., a profile, of the target object. The signal can be modified by various electronic circuitries for processing and conditioning so as to yield sensing and control information. The various electronics may be positioned either onboard or outboard of the magnetic-effect sensor's packaging.

Such magnetic-effect sensing may be employed to detect gear features, such as gear teeth and/or gear slots. A magnetic-effect sensor deployed for this purpose is commonly referred to as a "geartooth" sensor. Geartooth sensors may be used in the automotive arts to provide information to an engine controller for ignition timing control, fuel management, and other operations of the automotive power plant. For example, a geartooth sensor can be located in proximity to a ferrous target wheel positioned on a crankshaft of an engine to determine, for example, when the first piston is at top-dead center. Such determination may be made when the target wheel has features, e.g., teeth and slots that are properly keyed to mechanical operation of engine components.

As another example, a geartooth sensor can be located in proximity to a ferrous target wheel positioned on a camshaft of an engine to determine, for example, how to manage ignition timing. In one such embodiment, regularly spaced tooth-to-slot transitions yield a rhythmic, or regular, pulse pattern that can be used to determine the timing or "clocking" information necessary to run such functions of the engine as fuel injection and spark plug firing.

Further examples of magnetic-effect sensors can be found in of United States patents in the related art include: U.S. Pat. Nos. 6,404,168; 6,191,576; 6,232,832; 5,729,128; 5,694,040; 5,694,038; 5,650,719; 5,500,589; 5,497,084; 5,455,510; 5,414,355; 5,304,926 and 5,140,262. The entire content of each of these patents is incorporated herein by reference.

It is well known in the art that the waveforms produced by the magnetic-effect sensor change in response to varying "air gap" between the target and sensor faces. Also, differences among the biasing magnets used in the magnetic-effect sensor, temperature, mechanical stresses, irregular target feature spacing, etc., can vary the output of the magnetic-effect sensor. As a result, the point at which the magnetic-effect sensor changes state, i.e. the switch point, varies in time, or drifts, in relation to the degree of rotation of the target. The mechanical action of the engine as represented by the target, however, does not change. That is, there is a "true point" on the target in angle, or degrees of rotation, related to a hard-edge transition. Consequently, there is a point at which the magnetic-effect sensor should change state to indicate a mechanical function of the engine.

But due to inherent limitations of the sensing system, the point at which the sensor changes state will vary by some amount from this true point. Unfortunately, the magnetic-effect sensor does not provide the proper tooth-to-slot (and slot-to-tooth) position accuracy, i.e., it is not really giving a timing signal accurately representing piston travel. Therefore, the system controlled by the sensor can be inefficient.

Several schemes are known in the art to reduce sensor inaccuracies by providing an adaptive threshold of waveform voltage at which to switch the magnetic-effect sensor. The adaptive threshold, which is used as reference for comparing the output of the magnetic-effect sensor, seeks to switch the sensor at a nearly constant angle in order to decrease switch point drift and increase accuracy of the sensor and efficiency of the engine.

Various known systems for producing an adaptive threshold include systems that set the adaptive threshold at a fixed level above a measured minimum magnetic bias signal and then compare the output of the magnetic-effect sensor to this fixed level. This function, however, does not convey information proportional to air gap, therefore high accuracy is not achievable.

Another system uses a time-based integrator, such as an RC circuit, to set the threshold at the average value of magnetic bias. While this system can yield high accuracy, the accuracy is not achieved until considerable amount of target rotation has taken place. It is more desirable to achieve the adaptive threshold point very quickly in the target rotation. Such is especially true in automotive applications where federally-mandated emission requirements are ever reducing allowable exhaust gases and allowable open-loop control time at start-up.

Other proposals, such as that proposed by U.S. Pat. No. 5,650,719, include digital schemes for tracking high and low voltage peaks along with voltage minimums of the output waveforms. After tracking, the schemes are setup to select a point between the high and low peaks for the adaptive threshold, and thereafter update these peak and minimum values on a regular basis determined by a selected passage of target features.

However, all the known schemes for setting a threshold to compensate for the sensor inaccuracies to minimize switch point deviation suffer drawbacks. Such drawbacks may include increased circuit complexity, which leads to increased expense; extensive target rotation before the adaptive threshold is determined; and lessened overall accuracy of the determined adaptive threshold for the waveform variance.

Compromises among these negatives are inherent in any design. The present invention, however, seeks to minimize the deleterious tradeoffs and provide a magnetic sensor that provides an adequate balance of low cost, fast threshold acquisition time, and high accuracy.

BRIEF DESCRIPTION OF THE DRAWINGS

Exemplary embodiments are described below in conjunction with the appended drawing figures, wherein like reference numerals refer to like elements in the various figures, and wherein.

SUMMARY

Figure 1:
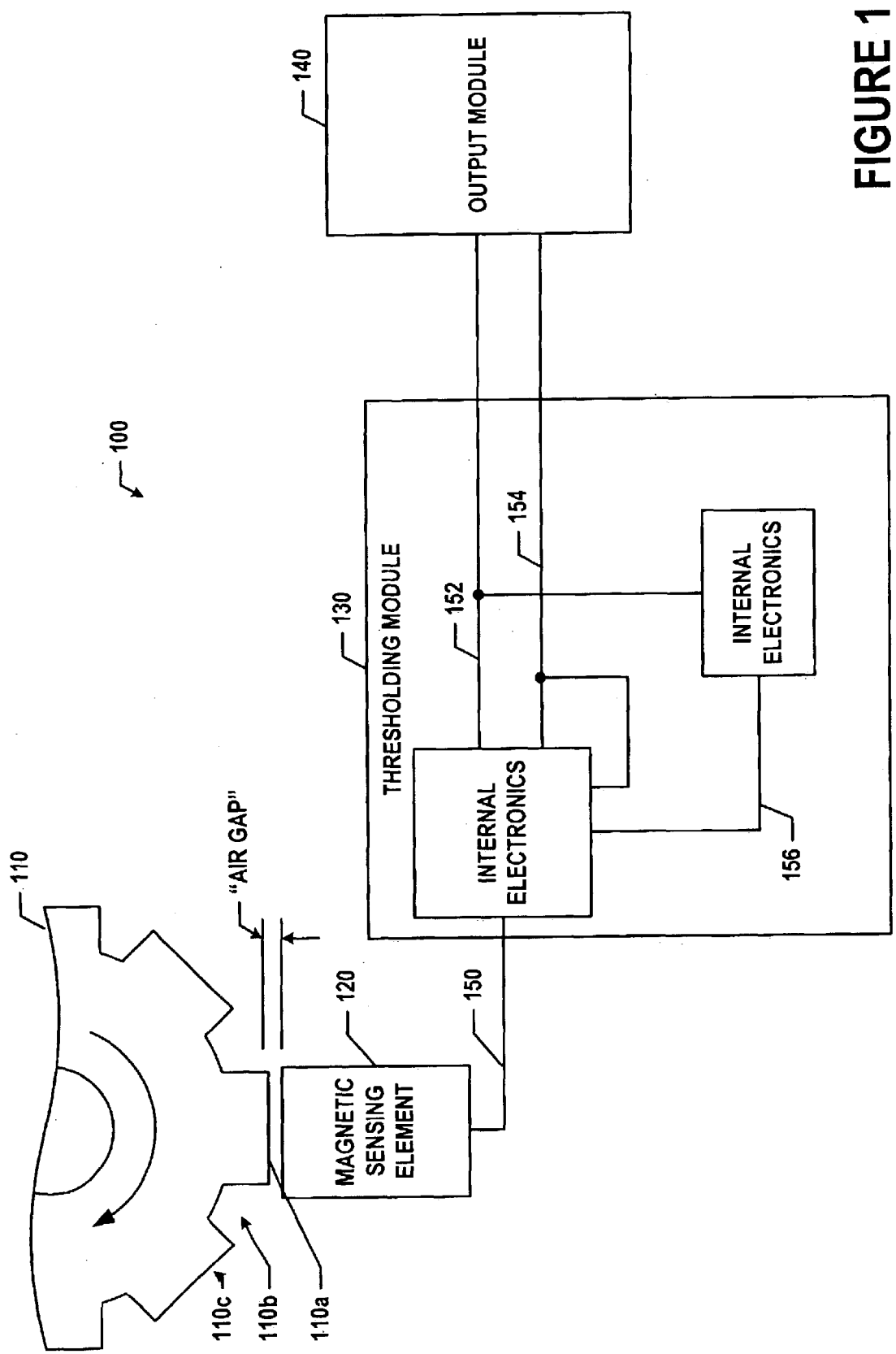
FIG. 1 is a block diagram illustrating a magnetic-effect sensor for detecting gear features in accordance with an exemplary embodiment.

An apparatus and method for detecting gear features is provided. The apparatus includes a magnetic sensing element, a thresholding module, and an output module. The magnetic sensing element is operable to provide a first signal that is indicative of the presence of a gear feature, such as a gear tooth and/or gear slot.

The thresholding module is operable to receive the first signal and responsively provide a second signal. The second signal may be an inverted or non-inverted, amplified replica, linear, and/or proportional version of the first signal. The thresholding module may also provide a reference signal. The thresholding module detects a first difference between the second signal and the reference signal, and responsively provides a third signal, which may be a function of the first difference. The thresholding module also detects a second difference between the third signal and the reference signal, and responsively adjusts the first signal.

The adjustment may be carried out (i) as a function of the second difference when the second difference falls below a given threshold and/or (ii) by a predetermined amount when the second difference satisfies the given threshold. The output module is operable to receive the reference signal and the second signal, and responsively produce an output signal as a function of a first and reference signals.

In an alternative embodiment, the apparatus and method for detecting gear features includes a magnetic sensing element, an amplifier module, a peak detector module, a feedback module, and an output module. The magnetic sensing element provides a plurality of differential signals indicative of the presence of the gear features.

The plurality of differential signals may be segregated into different sets of differential signals, each of which can be representative of a particular gear feature. For instance, the plurality of differential signals can be broken down into a first set of differential signals representative of a first gear feature, such a gear tooth, and a second set of differential signals representative of a second gear feature, such as a gear slot.

In one exemplary embodiment, the first set of differential signals has a larger differential than the second set of differential signals, and thus, the second set of differential signals will have be more negative when compared to the first set of differential signals. Further, a threshold can be set to differentiate the first feature from the second feature in such a deployment.

The amplifier module is operable to receive the plurality of differential signals and responsively provide a second signal. The second signal may be an inverted or non-inverted, amplified replica, linear, and/or proportional version of the plurality of differential signals.

The peak detector module is operable to detect a first difference between the second signal and a reference signal, and responsively provide a peak-detector signal that tracks the second set of differential signals and then holds at a peak of the second set of differential signals.

The feedback module is operable to receive the third and reference signals, and responsively adjust the plurality of differential signals. The feedback module adjusts the plurality of differential signals (i) as a function of a second difference between the third and reference signals when the second difference falls below a given threshold, and/or (ii) by a predetermined amount when the second difference satisfies the given threshold. The output module is operable to receive the second and reference signals, and responsively produce an output signal as a function of the second and reference signals.

DETAIL DESCRIPTION

In the following detailed description, numerous specific details are set forth in order to provide a thorough understanding of exemplary embodiments described herein. However, it will be understood that these embodiments may be practiced without the specific details. In other instances, well-known methods, procedures, components and circuits have not been described in detail, so as not to obscure the following description. Further, the embodiments disclosed are for exemplary purposes only and other embodiments may be employed in lieu of or in combination with of the embodiments disclosed.

1. Exemplary Architecture

FIG. 1 illustrates a magnetic-effect sensing apparatus ("sensor") 100 for detecting features, such as gear tooth 110a and a gear slot 110b, of gear 110 in accordance with an exemplary embodiment. The sensor 100 may be deployed with onboard or outboard electronics that incorporate a magnetic sensing element 120, a thresholding module 130, and an output module 140.

The magnetic sensing element may exploit most any magnetic sensing technique. For instance, the magnetic-sensing element may be deployed as one or more sub-elements that use hall effect, anisotropic magnetoresistive, giant magnetoresistive, colossal magnetoresistive, magnetoinductive, and "reed switch" sensing technologies.

These sub-elements may be arranged or configured in almost any configuration. One or more of the sub-elements may be configured in a voltage and/or current divider format, for example. In this configuration, the magnetic-sensing element 120 can provide a single pole (with respect to ground) or multi-pole output signal 150 in response to sensing a magnetic field. In another alternative, one or more of sub-elements (depending on design and manufacture) can be put in Wheatstone-bridge configuration. In such configuration, the magnetic sensing element in response to a magnetic field may output a differential signal (collectively referred to as the sensor-output signal 150).

The sensor-output signal 150 may be sent to an input of the thresholding module 130. The thresholding module may use the sensor-output signal 150 to carry out functions described below. The thresholding module 130 may contain any type of electronic circuitry, including resistors, capacitors, inductors, amplifiers, digital electronics, microprocessor, power-supply, regulator, and other integrated, monolithic, and/or discrete circuitry to carry out these functions.

The electronic circuitry may also use functional-adjustment electronics that can be adjusted, e.g., during manufacturing, to effectively set bounds for output signals of an output stage of the thresholding module 130. For instance, the thresholding module 130 may contain laser and/or electronically trimable resistors, capacitors, fusible links, etc, to condition the sensor-output signal 150. Temperature compensating and filter elements for minimizing and/or eliminating temperature and other environmental effects may also be provided.

The input of the thresholding module may be configured to receive the sensor output signal. Via internal electronic circuitry, the thresholding module 130 provides from its output stage to the output module 140 at least two output signals, namely, a characteristic waveform 152 and a reference signal 154. The characteristic waveform 152 and a reference signal 154 may also be supplied to other internal electronics of the thresholding module 130.

The characteristic waveform 152 may be a conditioned and/or amplified version of the sensor-output signal 150. This signal 152 may be, for example, inverted or non-inverted, amplified replica, linear, and/or proportional version of the sensor-output signal 150.

The reference signal 154 may be set a particular, predetermined threshold value. The threshold value may be based on the "swing" or, alternatively, the center point of the sensor-output signal 150 with or without a predetermined offset. The reference signal 154 may be used by the electronic circuitry of the thresholding module 130 and the output module 140 for comparison purposes.

After determining a difference between the characteristic waveform 152 and the reference signal 154, the internal circuitry of the thresholding module 130 responsively develops a tracking signal 156. The characteristics, e.g., amplitude, duration, and/or polarity, of the tracking signal 156 may be based on a function of the difference between the characteristic waveform 152 and the reference signal 154. For example, the tracking signal 156 may track positive and/or negative going portions of the characteristic waveform 152 and then hold at a positive and/or negative peak, respectively.

The characteristics of the tracking signal 156 may also be proportional to some or all of the difference between the characteristic waveform 152 and reference signal 154. That is, as the difference between the characteristic waveform 152 and reference signal 154 becomes smaller the characteristics of the tracking signal 156 may likewise become small, and vice-versa.

The tracking signal 156 may be fed to other internal electronics of the thresholding module 130. The thresholding module 130, via these other internal electronics, may detect a difference between the tracking signal 156 and the reference signal 154 or another reference signal (not shown). This difference may be used by the internal electronics as feedback to adjust the sensor-output signal 150. For example, when the difference between the tracking signal 156 and the reference signal 154 falls below (or alternatively, satisfies) a given threshold, the thresholding module 130 may adjust sensor-output signal 150 as a function of such difference. However, when the difference between the tracking and reference signals 156, 154 satisfies (or alternatively, falls below) the given threshold, the thresholding module 130 adjusts the sensor-output signal 150 not as a function the difference, but rather by some predetermined amount. It should be also noted that one skilled in the art would recognize that "falling below" may be equivalent to "less than" and "less than and equal to," and that "satisfying" may be equivalent to "greater than" and greater than and equal to."

The given threshold may be based upon a particular signature of the sensor-output-signal 150, a function, e.g., hysteresis triggering, of the output module 140, a particular magnetic field, etc. When, for example, the magnetic-sensing element 120 experiences a magnetic field above (or below) the particular magnetic field, the thresholding module 130 may adjust the sensor-output signal 150 so as to keep a minimum difference between the characteristic waveform 152 and the reference signal 154. This minimum difference may be set no less (or more) than the predetermined amount.

As such, the predetermined amount may be a constant. In which case, the adjustment of the sensor-output signal 150 may vary in accordance with changes in sensed magnetic fields so long as the difference is kept no less (or more) than the predetermined amount.

Alternatively, the predetermined amount may be varied so as to maintain a constant difference between the characteristic waveform 152 and the reference signal 154. Thus, when the magnetic-sensing element 120 senses magnetic fields above (or below) the particular magnetic field, the thresholding module 130 adjusts the sensor-output signal 150 to maintain the difference at the constant value. Other schemes for keeping the difference between the characteristic waveform 152 and the reference signal 154 above (or below) the predetermined amount are possible as well.

On the other hand, adjusting the sensor-output signal 150 as a function of the difference between the tracking and reference signals 156, 154 in turn allows the difference between the characteristic waveform 152 and the reference signal 154 to fall below the predetermined amount and/or approach a nullity. In either case, the adjustment of the sensor-output signal 150 in turn causes a change in the characteristic waveform 152. This change in combination with the reference signal 154 is used by the output module 140 to generate a module-output signal 160 indicative of the gear features.

The output module 140, like the thresholding module 130, may contain any type of electronic circuitry, including resistors, capacitors, inductors, amplifiers, digital electronics, microprocessor, power-supply, regulator, and other integrated, monolithic, and/or discrete circuitry. The output module 140 may also contain laser and/or electronically trimable resistors, capacitors, fusible links, and other functional-adjustment electronics for setting the boundaries to generate the module-output signal 160 as a function of the characteristic waveform 152 and the reference signal 154. Temperature compensating and filter elements for minimizing and/or eliminating temperature and other environmental effects may be provided as well.

The output module 140 may be configured to produce the module-output signal 160 with a digital signature. This digital signature may have a high state representative of the one gear feature, such as the gear tooth 110*a*, and a low state representative of another gear feature, such as the gear slot 110*b*.

To generate such a signature, the output module 140, via its internal electronics, may use single or hysteretic thresholding. Under hysteretic thresholding, the output module 140 may generate the high state when the characteristic waveform 152 approaches the reference signal 154 and the difference therebetween satisfies one of the hysteretic thresholds. Conversely, the output module 140 may generate the low state when the characteristic waveform 152 retreats from reference signal 154 and the difference therebetween satisfies the same or another hysteretic threshold.

Under single thresholding, the high and low states may be generated when the difference between the characteristic waveform 152 and the reference signal 154 falls below (or satisfy) the single threshold. The output module 140 may generate an analog module-output signal 160 as well. Moreover, the high and low states may be triggered in the opposite way and the hysteretic thresholds may be chosen based on the characteristics, e.g., amplitude, duration, and/or polarity, of the characteristic waveform 152.

Figure 2:
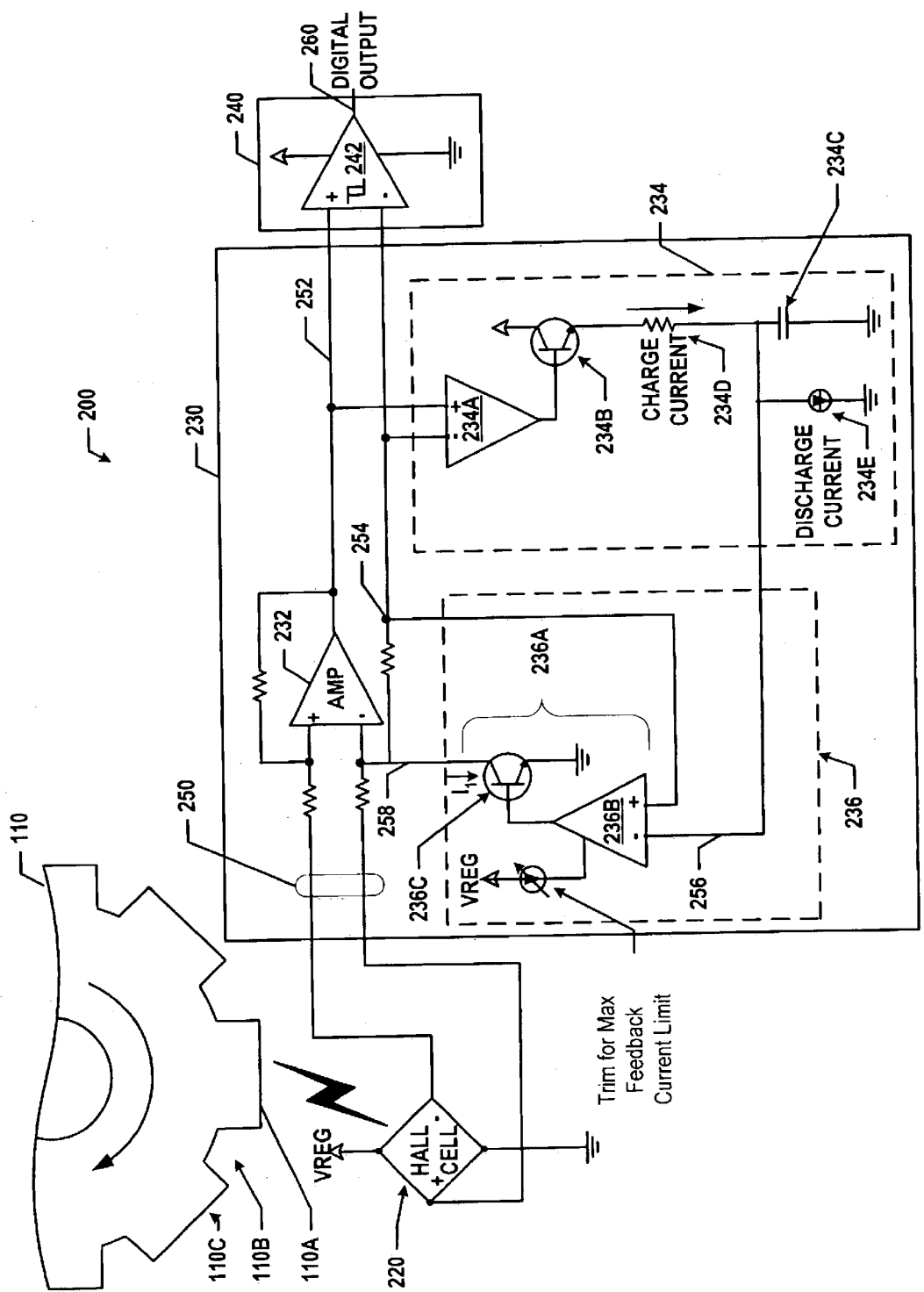
FIG. 2 is a high-level schematic illustrating another magnetic-effect sensor for detecting gear features in accordance with an exemplary embodiment.
Figure 3:
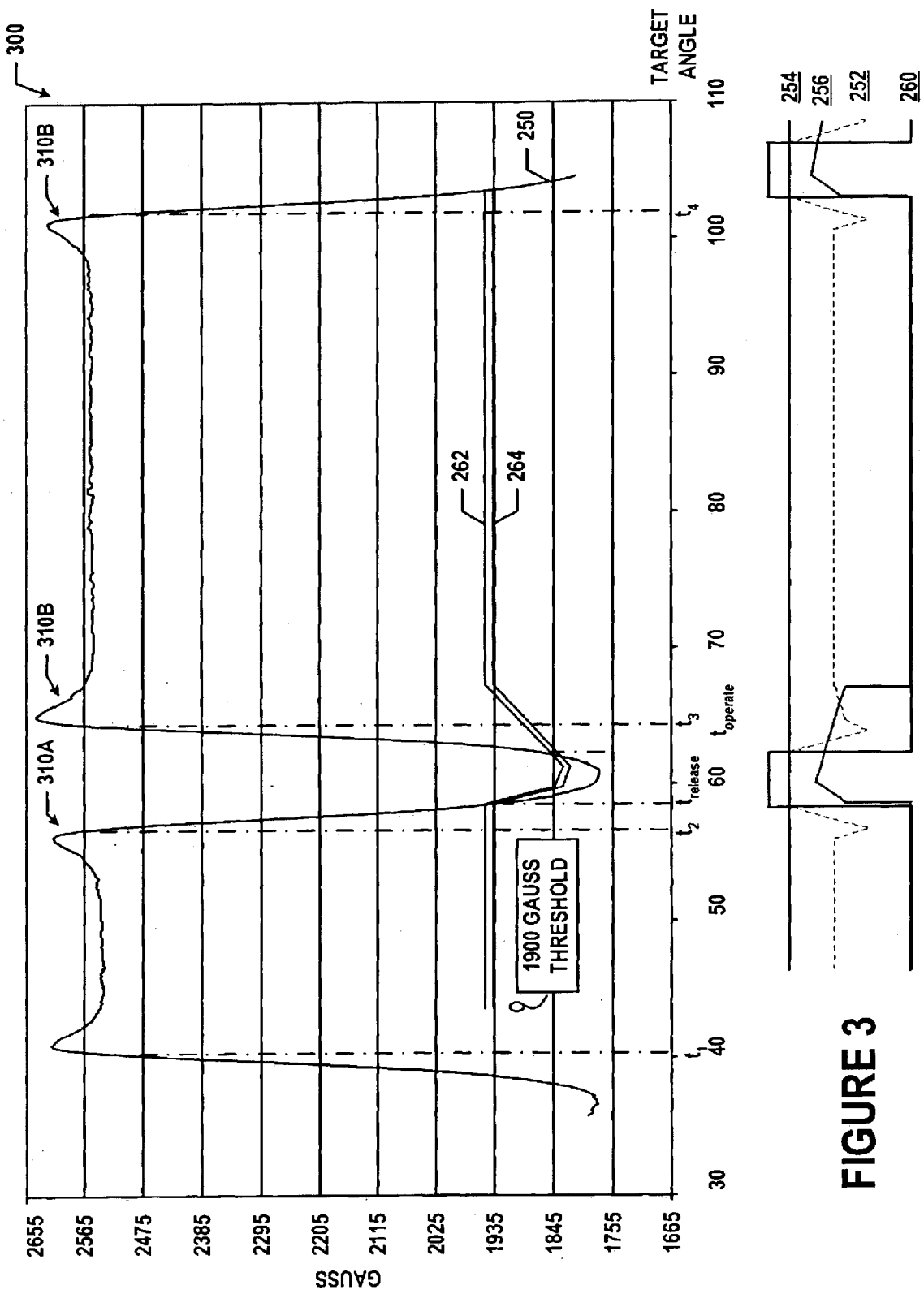
FIG. 3 is a first graph illustrating various signals a magnetic-effect sensor in accordance with an exemplary embodiment.

FIG. 2 illustrates a magnetic-effect sensor 200 for detecting features, such as gear tooth 110a and a gear slot 110b, of gear 110 in accordance with an exemplary embodiment. Like sensor 100, sensor 200 may be deployed with onboard or outboard electronics. Among these electronics are a magnetic sensing element 220; a thresholding module 230 having a signal amplifier 232, a peak detector module 234, and a compensating feedback module 236, and an output module 240 having, for example, a hysteretic comparator 242. Associated waveforms 300 for the sensor 200 are shown in FIG. 3.

In the exemplary embodiment shown in FIG. 2, the polarities of the electronics are shown for convenience only, and can be reversed and/or otherwise modified as a matter of choice. Further, in the following discussion, signals are presented in terms of voltages having certain polarities, durations, and amplitudes. These characteristics are presented for convenience only. The signals and characteristics may take other forms, deviate from that presented, and again are matter of choice within the skill of the art; thus need not be detailed.

Referring now to FIG. 2, the magnetic sensing element 220 is deployed as back-biased hall-effect element and placed in proximity to the gear 110. The magnetic sensing element 220 produces a sensor-output voltage 250 in response to the sensed magnetic fields. The back biasing offsets the sensor-output voltage 250 to a minimum voltage, which is proportional to the magnetic field applied by the back-biasing magnet. As the gear 110 (or conversely the sensor 200) moves, the excursions between the teeth and slots of the gear 110 will affect the magnetic bias of the hall-effect element. This causes the magnetic-sensing element 220 to generate sensor-output voltage 250 that may be directly proportional to the sensed magnetic fields and in turn gear features 110a, 110b.

To achieve optimum sensitivity and maximum swing, the sensor-output voltage 250 should be approximately equal to the minimum voltage when sensing the bottom of a gear slot having the deepest well. Thus, the maximum change in the sensor-output signal 250 is ideally representative of the excursion between the bottom of the gear slot and the top of the gear tooth. In practice, however, the minimum sensor-output voltage 250 is not set at the bottom of the slot, and the maximum change will increase or decrease as a result of undesirable magnetic field effects caused by the physical characteristics of the target gear 110. These physical characteristics, for example, may include the intersecting edges of the gear tooth 110a and gear slot 110b.

The sensor-output voltage 250 may be, for example, a differential voltage, which has characteristics largely dependent upon the air gap between the hall-effect element and the gear features 110a, 100b, but may also include temperature and bias magnetic strength effects. Several segments of sensor-output voltage 250 are shown in FIG. 3. The segment between time $t_1$ and $t_2$ may represent tooth 110a, and the segment between time $t_2$ and $t_3$ may represent slot 110b.

Referring back to FIG. 2, the sensor-output voltage 250 is sent to the signal amplifier 232. The signal amplifier 232 may have differential inputs, i.e., positive and negative inputs, to receive the sensor-output signal 250 as shown. The negative going differential of the sensor-output signal 250 may be coupled to the positive input of the signal amplifier 232. While the positive going differential may be coupled to the negative input of the signal amplifier 232. A feedback current 258 for modifying the sensor-output signal 250 may also be coupled to the negative input of the signal amplifier 232.

This feedback current 258 asymmetrically modifies the positive-going differential by shifting it down toward the negative-going differential by different amounts. These amounts in turn are based upon the amount of feedback current 258. More feedback current 258 causes a greater shift, and vice-versa.

The amount of feedback current 258 is a function of a difference between reference and tracking signals 254, 256 that are fed back to the compensating feedback module 236. This function may be governed by the following rules. First, when the difference between the reference and tracking signals 254, 256 satisfies an upper threshold, the feedback current 258 is adjusted to a predetermined level. Second, the feedback current 258 is adjusted in proportion to the difference between the reference and tracking signals 254, 256 when such difference falls between the upper threshold and a lower threshold. Third, little or no feedback current 258 flows when the difference falls below the lower threshold. These rules are non-exhaustive and other rules may be used in lieu of the three provided.

The upper threshold, for example, may be set to a particular magnetic field so that when the hall-effect element senses a magnetic field (as reflected in difference between the reference and tracking signals 254, 256 being) above the upper threshold, a maximum amount of feedback current 258 flows. As such, the positive-going differential is shifted down toward the negative-going differential by the maximum amount.

As the hall-effect element senses magnetic fields below the upper threshold and above the lower threshold, the feedback current 258 is reduced in proportion to the sensed magnetic fields. As will be described in more detail below, this is reflected in the difference between tracking and reference signals 256, 254.

The lower threshold may also be set to a particular magnetic field. When the hall-effect element senses a magnetic field below the lower threshold, little or no feedback current 258 flows. As such, the feedback current 258 produces little or no shift in the positive-going differential. This is also reflected in the difference between reference and tracking signals 254, 256 as described below.

The tracking signal 256 that is fed back to the compensating feedback module 236 for adjusting the sensor-output voltage 250, in turn, is a function of the reference signal 254 and another downstream signal. This other downstream signal is a characteristic waveform 252 provided by the signal amplifier 232.

The signal amplifier 232 receives the modified sensor-output voltage 250 and responsively amplifies, inverts, and conditions it into the characteristic waveform 252 as shown in FIG. 3. This waveform 252, however, may be a non-inverted, amplified replica, proportional, and/or other version of the modified sensor-output voltage 250. The characteristic waveform 252 and reference signal 254 are then supplied to the peak-detector module 234 and the hysteretic comparator 242, e.g., a Schmitt Trigger, of the output module 240.

The reference signal 254 may be a constant value. This constant value may be set at about one-half a supply voltage that is applied to the magnetic sensing element 220. Alternatively, the reference signal 254 may be proportional to, e.g., one-half of the swing or "centerline" of, the sensor-output voltage 250. The reference signal 254 may also be offset from the centerline.

The peak-detector module 234 may be configured to use the characteristic waveform 252 and the reference signal 254 to track some or all of the sensor-output voltage 250 that is representative of a gear slot, such as gear slot 110a. To do so, the peak-detector module 234 detects a difference between the characteristic waveform 252 and the reference signal 254. As long as the characteristic waveform 252 is about equal to (or greater than) the reference signal 254, the tracking signal 256 generated by the peak-detector module 234 is proportional to the sensor-output voltage 250 during such time.

On the other hand, when the characteristic waveform 252 is less than the reference signal 254 by some predetermined amount, the peak-detector module 234 stops generating the tracking signal 256. Sometime thereafter, the tracking signal is 256 reduces to a nullity. Before the reduction, however, the tracking signal 256 may decay slightly via internal electronics of the peak-detector module or, alternatively, the tracking signal 256 may be maintained at its last value.

To facilitate providing such tracking signal 256, the peak detector module 234 may be deployed with a differential amplifier 234a for controlling a switch 234b, which, as shown, is embodied as an NPN transistor. The differential amplifier 234a and switch 234b may take other forms, and are considered a matter of choice within the art; thus need not be detailed.

When the switch 234b closes, (e.g., when the base of the switch 234b is biased so as to cause a sufficient base-emitter voltage to allow current to from the collector to emitter), a source supplies a voltage to charge capacitor 234c via charging resistor 234d. The charge stored on the capacitor 234c builds towards the source voltage so long as the switch 234b remains closed. The switch 234b may remain closed while the characteristic waveform 252 is about equal to (or greater than) and the reference signal 254. Thus, the voltage potential established on the capacitor 234c (i.e., the tracking signal 256) is proportional to a segment of the sensor-output voltage 250 that is representative of a gear slot.

When the switch 234b opens (e.g., when the base of the switch 234b is not biased sufficiently to allow current to flow from the collector to emitter), the charge on the capacitor 234c is gradually discharged. Eventually, the capacitor 234c is discharged to the point where the feedback current 258 is limited, and thus, the feedback loop is broken. Thereafter, the capacitor 236c is clamped to ground by current source 234c or other internal circuitry of peak-detector module 234 (not shown).

In an alternative embodiment, the peak detector module 234 may deploy digital electronics to carry out the peak detection. Other combinations are possible as well.

As noted above, the compensating feedback module 236 to responsively provide the feedback current 258 according the asymmetric function described above may use the difference between the reference and tracking signals 254, 256. To facilitate this asymmetric function, the compensating feedback module 236 may be deployed with a current amplifier 236a that sources the feedback current 258.

The current amplifier 236a may be constructed from a differential amplifier 236b and a switch 236c capable of current amplification. As shown, the switch 236c is embodied as an NPN transistor. The differential amplifier 236b and switch 236c may take other forms, and are considered a matter of choice within the art; thus need not be detailed.

However, to carry out the asymmetric function, the current output of the differential amplifier 236b is set according to the following rules. First, the output current is at its maximum when the difference between the reference and tracking signals 254, 256 is above a particular magnetic field. Second, the output current is set to its minimum, e.g., zero amps, when the tracking signal 256 is about equal to the reference signal 254. This may occur when the offset of sensor-output voltage 250 caused by the back-biased magnetic is greater than the reference signal 254. The minimum current may be alternatively greater than zero amps. Third, the output current is proportional to the difference between the reference and tracking signals 254, 256 when such difference is below the particular magnetic field and above the field corresponding to the minimum output current.

Figure 4:
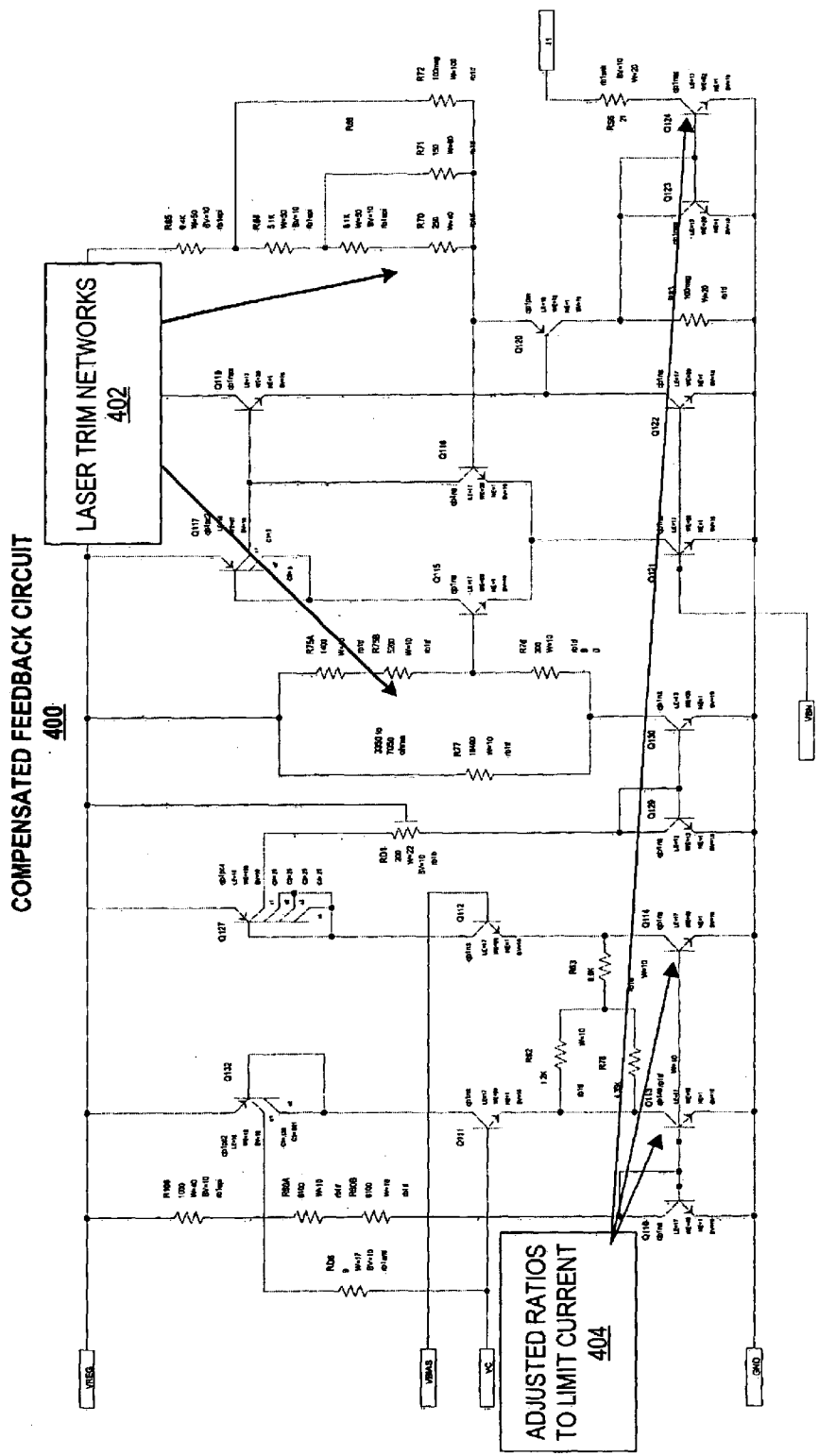
FIG. 4 is a detailed schematic view of a compensated feedback module in accordance with an exemplary embodiment.

The adjustment of the output current may be performed during manufacturing, installation, or any other time. For instance, the sensor 200 may be exposed to one or more magnetic fields during which measurements are taken and the output current is functionally adjusted. The functional adjustment can be carried out with manufacturing, lab, and/or field equipment having the ability to laser and/or electronically trim resistors, capacitors, and/or fusible links. By changing the resistive, capacitive, and/or fusible links, the output current can be set. FIG. 4 is a detailed schematic view of an embodiment of the compensated feedback module 234 illustrating laser trim networks 402 and adjusted transistor ratios 404 for limiting the output current of the current amplifier 234a.

Returning to FIG. 2, the hysteretic comparator 242 of the output module 240 may be configured to receive the characteristic waveform 252 and reference signal 254, and responsively generate a digital module-output signal 260 having high and low states. The high state may be triggered when the difference between the characteristic waveform 252 and the reference signal 254 rises above one of the hysteretic thresholds. The low state may be triggered when the difference between the characteristic waveform 252 and the reference signal 254 falls below another hysteretic threshold. Alternatively, the digital signal of output module 240 may be provided by other digital circuitry. The output module 240 may generate an analog signal instead.

2. Exemplary Operation

An exemplary operation of the sensor 200 may be carried out as follows. This operation of the sensor 200 is discussed with reference to FIGS. 2 and 3. FIG. 3 is a graph containing curves 300 that illustrate (i) the sensor-output voltage 250 (without modification by the feedback current); (ii) the characteristic waveform 252; (iii) the reference signal 254; (iv) the tracking signal 256; (v) the digital output signal 260; and (vi) the hysteretic thresholds 262, 264 for the digital output signal 260.

The sensor-output voltage 250 and hysteretic threshold 262, 264 are shown translated to magnetic field strength in gauss. The other signals are shown with reference to a voltage scale but without units so as not to obscure the following description. These curves 300 are shown for exemplary purposes only and the characteristics of the curves 300 may vary from those presented.

Moreover, each of the curves 300 is shown in reference to particular rotational angles of a circular-type gear, such as gear 110. Other rotational angles may be used and the gear need not be circular. And for the purposes of the example, the maximum feedback current 258 is set at 1900 gauss. Thus, when the sensor-output voltage 250 is at or above a voltage equivalent to 1900 gauss, the maximum feedback current 258 flows.

As the gear 110 (or conversely the sensor 200) rotates, the excursions from between the gear tooth 110a to the gear slot 110b on to a second gear tooth 110c and so on, affect the magnetic bias of the hall-effect element. This is reflected in the sensor-output voltage 250 illustrated in FIG. 3. The sensor-output voltage 250 may be broken into several segments. The first of these segments, which is between time $t_1$ and $t_2$, is representative of the gear tooth 110a. The second segment, which is between time $t_2$ and $t_3$, may represent the gear slot 110b. And the third segment, which is between time $t_3$ and $t_4$, may be representative of the gear tooth 110c.

At time $t_1$, the sensor-output voltage 250 is at a voltage greater than 1900 gauss, so the maximum feedback current 258 flows, which shifts the sensor-output voltage 250 down the maximum amount. However, the shifted sensor-output voltage is still significantly greater than the minimum sensor-output voltage.

The signal amplifier 232 inverts the shifted signal as is reflected in the characteristic waveform 252 between time $t_1$ and $t_2$. Because the reference signal 254 is set below the magnetic back biasing of the magnetic-sensing element 220, the characteristic waveform 252 is below the reference signal 254. The characteristic waveform 252 is maintained significantly below the reference signal 254 because the shifted sensor-output voltage is significantly above than the minimum sensor-output voltage.

Given that the characteristic waveform 252 is significantly below the reference signal 254, the difference between these signals may be below the negative-going hysteretic threshold 264. As such, the module-output signal 260 will go to its low state as shown between time $t_1$ and $t_2$. Moreover, the peak-detector module 234 provides no tracking signal 258 since the characteristic waveform 252 is below the reference signal 254. Consequently, the differential amplifier 234a cannot bias the switch 234b to charge the capacitor 234c. Thus, the tracking signal 256 is maintained in its previous state, which as shown, is the voltage on the capacitor 234c clamped to ground.

Since the tracking signal 256 is clamped to ground, the difference between the reference and tracking signals 254, 256 is at its maximum. Feeding these signals to the current amplifier 236a of the compensated feedback module 236 causes the feedback current 258 to be maintained at its maximum value. Thus, coming full circle.

At time $t_2$, the sensor-output voltage 250 transitions from the segment representative of the gear tooth 110a to the segment representative of the gear slot 110b. During this transition, the sensor-output voltage 250 decreases from its maximum value to its minimum value. The minimum value is indicative of the middle of the gear slot 110b.

The increasing characteristic signal 252 supplied by signal amplifier 232 reflects the decrease in the sensor-output voltage 250. While the sensor-output voltage 250 remains above the 1900 gauss threshold, the characteristic waveform 252 remains significantly below the reference signal 254. This prevents the peak-detector module 234 from generating the tracking signal 256 and prevents a change in state in the module-output voltage 260. Because no tracking signal 256 is generated, the feedback current 258 is maintained at its maximum value.

However, when the sensor-output signal 250 drops below the 1900 gauss level at time $t_{release}$, the characteristic waveform 252 becomes about equal to the reference signal 254, which sets off a number of events. First (but in no particular order), the difference between the characteristic waveform 252 and the reference signal 254 rises above the positive going hysteretic threshold 262 to cause the module-output voltage 260 to switch to the high state as shown at time $t_{release}$.

Second, the peak-detector amplifier 234a is biased such that cap 234c is charged. This causes the capacitor 234c to jump radically to its previous voltage, thereby generating the tracking signal 256. Third, the peak-detector module 234 via the differential amplifier 234a detects that the characteristic waveform 252 becomes about equal to the reference signal 254 and biases the switch 234b so that the tracking signal 256 (i.e., the voltage on the capacitor 234c) begins to approach the sourced voltage.

Fourth, current amplifier 236a detects that tracking signal 256 begins to approach the reference signal 254. Because the difference therebetween is below the upper threshold, the current amplifier 236a begins to throttle back the feedback current 258 in proportion to the difference. This, in turn, reduces the amount of shift applied to the sensor-output signal 250.

As the sensor-output signal 250 continues to fall to its minimum amount, the signal amplifier 232 attempts to increase the characteristic curve 252. But because of the proportional feedback current 258, the characteristic curve 252 is maintained at about equal to the reference signal 254. Consequently, the differential amplifier 234a of the peak-detector module 234 continues to bias the switch 234b, thereby causing the tracking signal 256 (i.e., the voltage on the capacitor 234c) to increase toward the reference signal 254. This, in turn, causes the current amplifier 236a to throttle back the feedback current 258 even more, further reducing the amount of shift the in sensor-output signal 250. Eventually, the sensor-output voltage 250 reaches its minimum value. When this happens, the feedback current 258 is at a minimum.

As the sensor-output voltage 250 begins to increase from its minimum, the instantaneous increase is reflected as an instantaneous decrease in the characteristic waveform 252 supplied by the signal amplifier 232. Accordingly, differential amplifier 234a of the peak-detector module 234 detects that the characteristic waveform 252 is no longer about equal to the reference signal 254 and no longer biases the switch 234b. This causes the tracking signal 256 (i.e., the voltage established on the capacitor 234c) to no longer increase toward the reference signal 254.

However, the tracking signal 256 may be maintained at about or slightly below its previous value. As a result, the difference between the tracking signal 256 and the reference signal 254 as detected by the current amplifier 236a of the compensated feedback module 236 remains about the same or slightly increases. In turn, feedback current 258 is kept at about or slightly above its minimum value. The feedback current 258 therefore creates little or no shift in the sensor-output voltage 250, which keeps the average of characteristic waveform 252 at about equal to the reference voltage 254.

At time $t_{operate}$, the characteristic waveform 252 provided by the signal amplifier is lower than the reference voltage 254. This results from an increase in the sensor-output voltage 250, since the feedback current 258 is relatively constant. Moreover, the difference between the characteristic waveform 252 and the reference signal 254 falls below the negative going hysteretic threshold 264, thereby triggering the module-output voltage 260 to change to the low state.

As the sensor-output voltage 250 increases but remains below the 1900 gauss threshold, the characteristic waveform 252 provided by signal amplifier 232 decreases. The peak-detector module 234, via its differential amplifier 234a, detects that the characteristic waveform 252 remains below the reference signal 254. The differential amplifier 234a and switch 234b combination does not cause the tracking signal 256 to fall in relation difference between the characteristic waveform 252 and the reference signal 254.

Rather, the tracking signal 256 changes in proportion to the difference between the characteristic waveform 252 and the reference signal 254 as a result of the discharge current source 234e or other internal electronics (not shown). Thus, the tracking signal 256 changes in relation to the reference signal 254, which causes the current amplifier 236a to increase the feedback current 258. In turn, the feedback current 258 increases the amount of shift in the sensor-output voltage 250.

At some point past the time $t_3$, the sensor-output voltage 250 rises above the 1900 gauss threshold. When this happens, the tracking signal 256 (i.e., the voltage on the capacitor 234c) is discharged to ground. This causes the current amplifier 236a to detect a difference between the reference and tracking signals 254, 256 that reflects that sensor-output voltage 250 rises above the 1900 gauss threshold. Accordingly, the current amplifier 236a generates the maximum feedback current 258, which in turn causes the maximum shift in the sensor-output voltage 250. For the rest of the period between $t_3$, see time $t_1$. At time $t_4$, the cycle begins anew.

3. Anomaly Rejecting and/or True-Power-On Sensor

Figure 5:
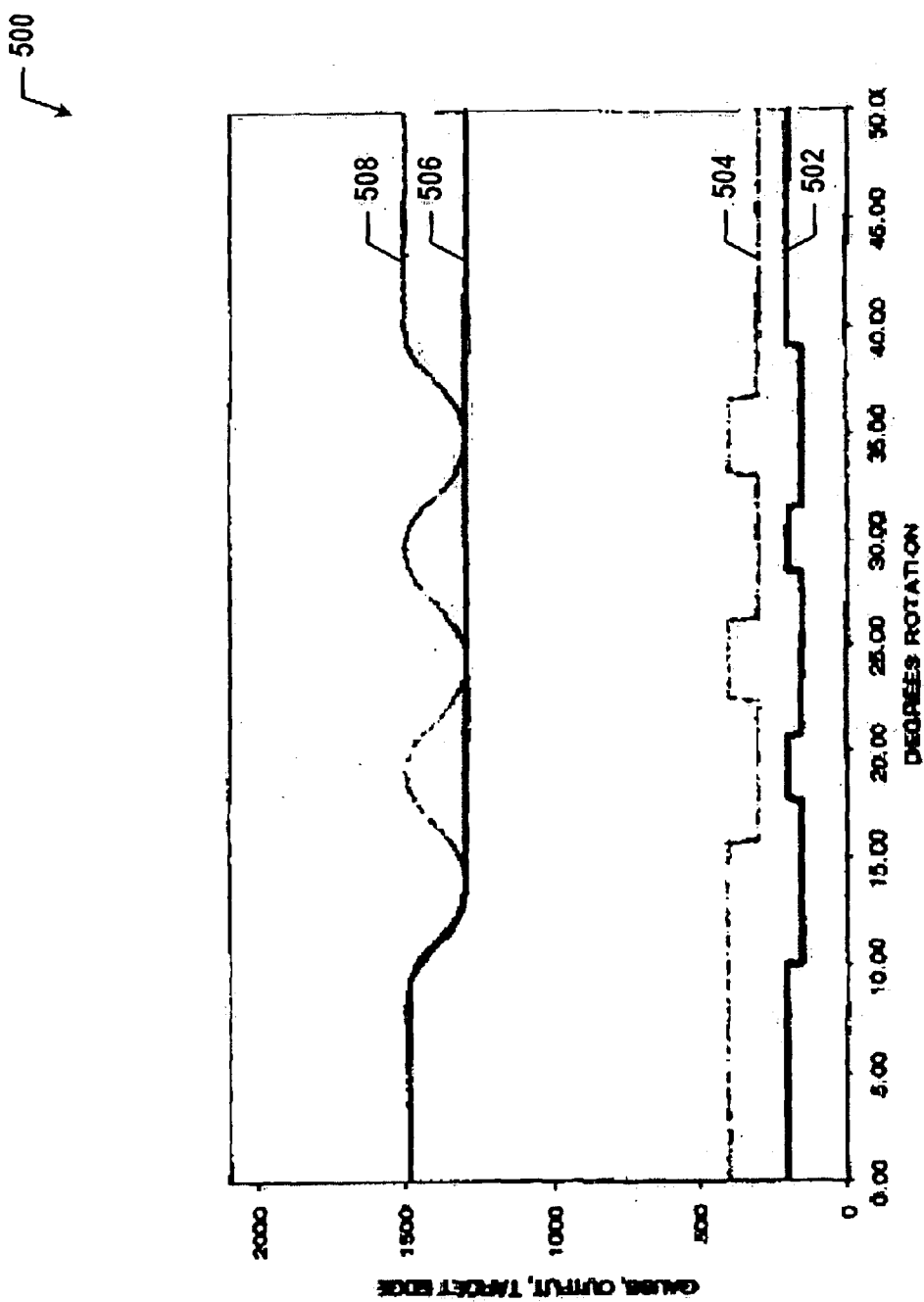
FIG. 5 is a second graph illustrating a first set of various ideal waveforms of a given sensor.

The following describes a sensor ("sensor-Z") that does not include or employ the thresholding module or functions thereof of the sensors 100, 200. FIG. 5 is a graph containing a set of curves 500 that illustrate various ideal waveforms of the sensor-Z. This sensor may be deployed with the magnetic-sensing element 220, the signal amplifier for the magnetic sensing element 232, the peak detector module 234, and the output module 240. The set of curves 500 includes a target or gear curve 502 (collectively referred to as the gear curve), a module-output signal curve 504, a tracking signal curve 506, and a magnetic-sensing element curve 508.

The gear curve 502 has deviations that represent the teeth and slots of the gear. A tooth is shown at a value of 200 gauss and a slot is shown as a value of 150 gauss as per the scale on the left of the graph. The magnetic-sensing element curve 508 represents the sensor-output voltage 250 of the magnetic-sensing element 220. As the gear rotates, the excursions from between the gear teeth and slots affect the magnetic bias of the magnetic-sensing element 220. These excursions are translated into gauss.

The tracking signal curve 506 represents a voltage measured on the storage capacitor 234c of the peak-detector module 234. This voltage is translated into gauss. The module-output signal curve 504 illustrates the module-output signal 260 of the output module 240. As shown, the module-output signal 260 has a digital signature with high and low states.

The graph assumes that power is applied to the sensor-Z and rotation of gear starts at 0 degrees rotation and is kept at a constant rate. Below about 10 degrees of rotation, the tracking signal 256 (translated to gauss) provided by the peak-detector module 234 follows the gear tooth signature of the sensor-output voltage 250 sensed by the magnetic-sensing element 220. As the gear rotates into the first slot, the tracking signal 256 continues to track the sensor-output voltage 250 as it decreases.

After reaching its minimum value for the first slot, the sensor-output voltage 250 begins to increase as it approaches the next tooth. The tracking signal 256, however, does not increase but rather holds the voltage (translated to gauss) on the storage capacitor 234c at minimum level of the sensor-output signal 250.

The output module 240 may be configured to switch its output low when the sensor-output voltage 250 exceeds the tracking signal 256 by a predetermined amount, e.g., 60 gauss. The output module may also be configured to switch its output back high when the sensor-output voltage 250 comes back within 40 gauss of the tracking signal 256.

This type of sensor has a number of distinct advantages, such as adaptive compensation that results from the peak detector circuit adjusting its output level at every slot, if desired. Such adjustment compensates for any drift in sensor resulting from the bias magnet and/or and change is magnet strength due to temperature changes, offsets in the magnetic-sensing element due to package stress and other factors effecting performance. Further, the same sensor can be deployed for use with many different types of gears and target wheels because the need to adjust or calibrate the sensor is minimized or eliminated.

Like the sensor-Z described directly above, either of the sensors 100, 200 can perform the same functions and provide the same advantages. Unlike the sensor-Z, both of the sensors 100, 200 may be deployed as an anomaly rejecting sensor and/or a true-position-on sensor. The following exemplifies the shortcomings of sensor-Z in such applications.

When deployed as a camshaft sensor for use in late model quick-start-engine-control systems, the sensor-Z may provide extra, incorrect, or false module-output voltages. In the quick-start-engine-control systems, the first few pulses of the module-output signal 260 are used to start the engine quickly.

When the sensor-Z is mounted at a close air gap, e.g., within about 0 to 100 thousandths of an inch, to the gear feature, the sensor-output voltage 250 may have anomalies resulting from edge effects of the magnet in relation to the edge of a tooth and/or slot. These anomalies can cause a sensor, such as sensor-Z, to switch incorrectly and/or provide false pulses. False pulses can send the engine timing out of sequence causing numerous problems with the control system and engine.

Figure 6:
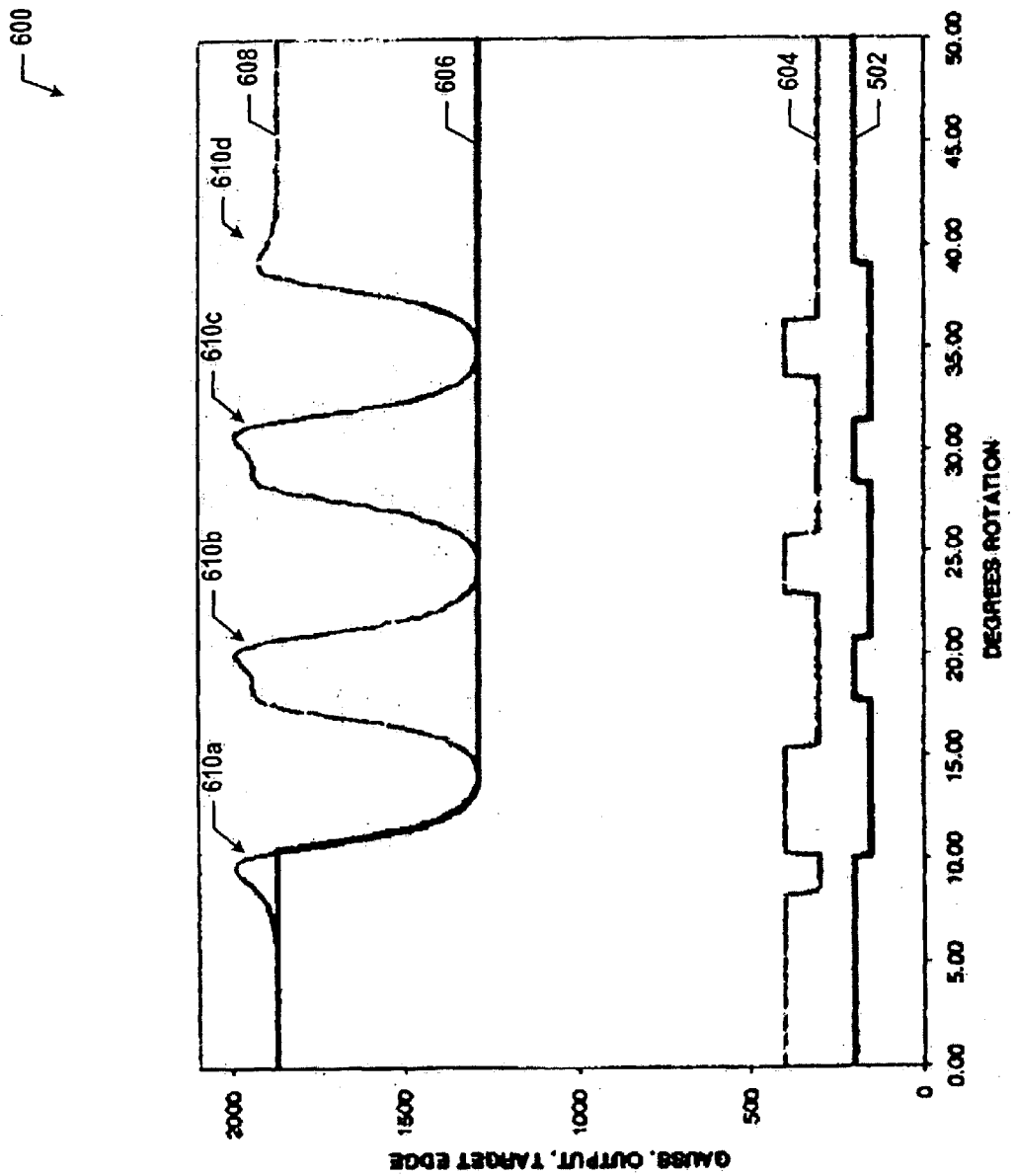
FIG. 6 is a third graph illustrating a second set of various waveforms of the given sensor.

With reference to FIG. 6, a graph containing a set of curves 600 that illustrate various waveforms of the sensor-Z is provided. The set of curves 600 includes the gear curve 502, a module-output signal curve 604, a tracking signal curve 606, and a magnetic-sensing element curve 608. The curves 600 of FIG. 6 are similar in most respects to the curves 500 illustrated in FIG. 5, except as described here.

The magnetic-sensing element curve 608 represents the sensor-output voltage 250 signal of the magnetic-sensing element 220. As the gear rotates, the excursions from between the gear teeth and slots affect the magnetic bias of the magnetic-sensing element 220. But when the magnetic-sensing element 220 is mounted at the close air gap, sensor-output signal 250 has pronounced edge effects 610(a–d).

When sensor-Z starts or powers-up on a tooth at the close air gap and then approaches the tooth-to-slot edge effect, the sensor-output voltage 250 is greater than the tracking signal 256 (translated to gauss) established near the tooth center. If the tooth-to-slot edge effect is greater than the 60 gauss trigger level of the output module 240, a false pulse is produced, which can cause numerous problems as noted.

In contrast, when deployed as a camshaft sensor for use in late model quick-start-engine-control systems, either of the sensors 100, 200 does not provide extra, incorrect, or false module-output voltages. Being able to quickly detect slots within the first few pulses of the module-output signal 260 allows the quick-start-engine-control systems to start the engine quickly, reducing or eliminating customer dissatisfaction.

Figure 7:
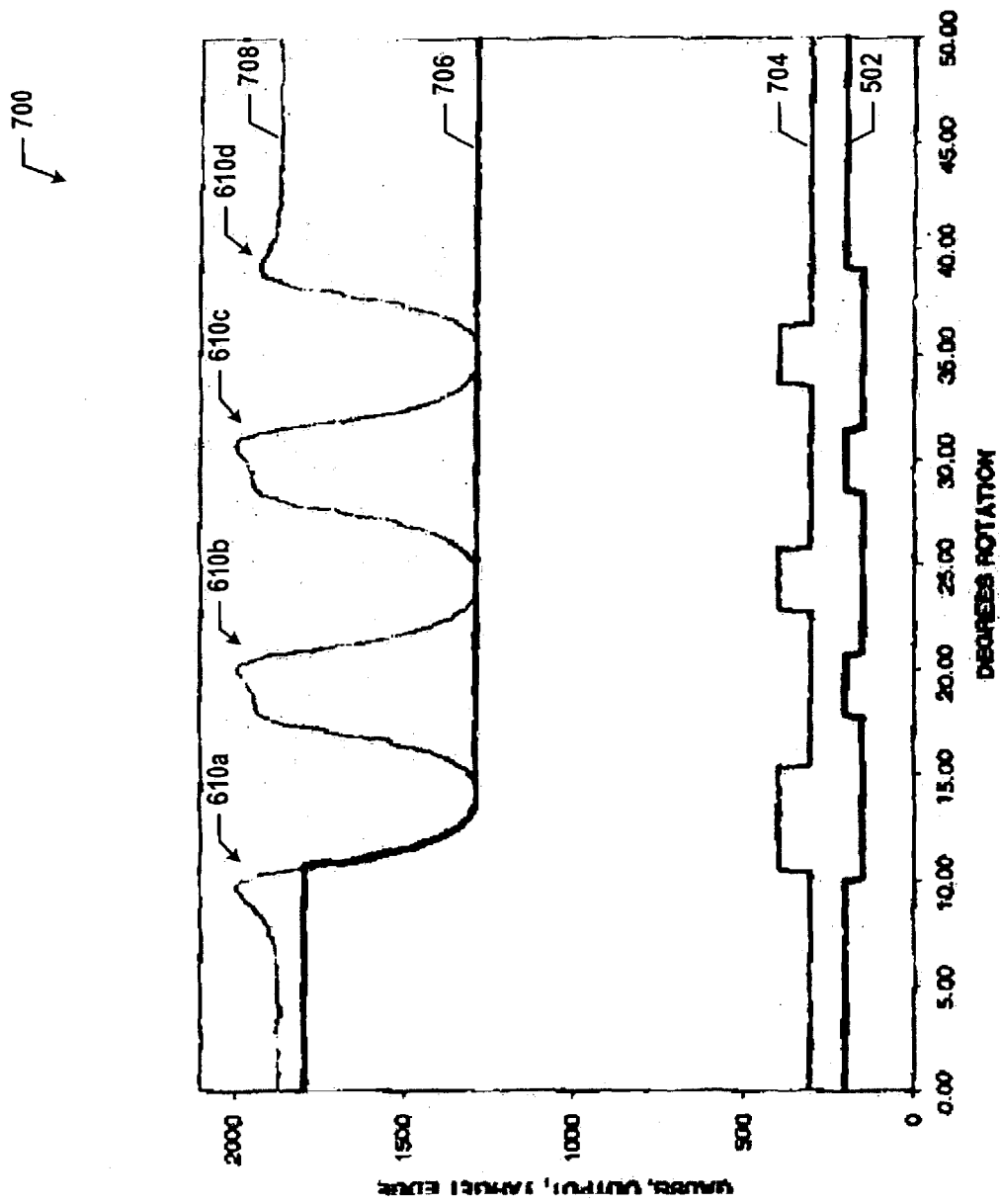
FIG. 7 is a fourth graph illustrating various waveforms of another magnetic-effect sensor for detecting gear features in accordance with an exemplary embodiment.

Referring now to FIG. 7, a graph containing curves 700 that illustrate various waveforms of sensor 200 is provided. This set of curves 700 includes the gear curve 502, a module-output signal curve 704, a tracking signal curve 706, and a magnetic-sensing element curve 708. The curves 700 of FIG. 7 are similar in most respects to the curves 600 illustrated in FIG. 6, except as described here.

As described in great detail above, the thresholding module and/or the function thereof may asymmetrically limit the feedback current 258 so as to "threshold" or "rail out" compensation of the sensor-output voltage 250, allowing normal slot levels to trigger the output module 240. Signals above the predetermined threshold, e.g., 1800 gauss, will be effectively ignored due to the thresholding thereby eliminating the cause of false triggers.

Referring back to FIG. 3, edge effects 310(a–c) do not affect the module-output signal 260. The negation of the edge effects occurs because the increase in the sensor-output voltage 250 due to the edge effects is still greater than the 1900 gauss threshold, which causes the feedback current 258 to remains at its maximum value. Although this increase is reflected a decrease in the characteristic waveform 252, this decrease causes a greater separation from the reference signal 254. In turn, the tracking signal 256 remains at its previous value, thereby keeping the difference between the reference and tracking signals 254, 256 the same. Thus, the current amplifier 236a keeps the feedback current at its maximum value.

Moreover, when the sensor 200 powers up on a gear tooth or on an edge of a tooth as shown at lime $t_0$, the feedback current 258 is set to its maximum. With the feedback current 258 set at its maximum, the module-output signal 260 switches low on power-up. A power-up recognition sensor could be made using sensors 100 or 200. To do so, the threshold level may be set at a point to effectively clip the tooth signal at all possible air gaps. Other variations include modifying the 40 and 60 gauss trigger level to trigger at other levels.

4. Conclusion

In view of the wide variety of embodiments that can be applied, it should be understood that the illustrated embodiments are exemplary only, and should not be taken as limiting the scope of the following claims. For instance, in the exemplary embodiments described herein include vehicle mounted devices, which may include or be utilized with any appropriate voltage source, such as a battery, an alternator and the like, providing any appropriate voltage, such as about 12 Volts, about 24 Volts, about 42 Volts and the like.

Further, the embodiments described herein may be used with any desired system or engine. Those systems or engines may comprises items utilizing fossil fuels, such as gasoline, natural gas, propane and the like, electricity, such as that generated by battery, magneto, solar cell and the like, wind and hybrids or combinations thereof. Those systems or engines may be incorporated into another systems, such as an automobile, a truck, a boat or ship, a motorcycle, a generator, an airplane and the like.

In the embodiments described above, the apparatus may include computing systems, controllers, and other devices containing processors. These devices may contain at least one Central Processing Unit ("CPU") and a memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the exemplary embodiments are not limited to the above-mentioned platforms or CPUs and that other platforms and CPUs may support the described methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system.

Exemplary embodiments have been illustrated and described. Further, the claims should not be read as limited to the described order or elements unless stated to that effect. In addition, use of the term "means" in any claim is intended to invoke 35 U.S.C. §112, ¶6, and any claim without the word "means" is not so intended.

What is claimed is:

1. An apparatus for detecting gear features, the apparatus comprising:
   a magnetic sensing element providing a first signal indicative of the presence of a gear feature;
   a thresholding module operable to:
   (a) receive the first signal and responsively provide a second signal;
   (b) provide a reference signal;
   (b) detect a first difference between the second signal and the reference signal, and responsively provide a third signal as a function of the first difference; and
   (c) detect a second difference between the third signal and the reference signal, and responsively adjust the first signal (i) as a function of the second difference when the second difference falls below a given threshold and (ii) by a predetermined amount when the second difference satisfies the given threshold; and
   an output module operable to receive the reference signal and the second signal, and responsively produce an output signal as a function of a first and reference signals.

2. The apparatus of claim 1, wherein the first signal has a first portion representative of a first gear feature and a second portion representative of a second gear feature, and wherein the given threshold is chosen such that when the first portion contains an errant portion that indicates a false presence of the second gear feature when one is not present, the thresholding module adjusts the first signal by the predetermined amount so as to provide to the output module the second and reference signals without the false presence.

3. The apparatus of claim 2, wherein the output module produces an output signal as a function of a difference between the second and reference signals, and wherein when the thresholding module adjusts the first signal by the predetermined amount, the difference between the second and reference signals is maintained above a second threshold.

4. The apparatus of claim 3, wherein the second threshold is approximately equal to the given threshold less the reference signal.

5. The apparatus of claim 1, wherein the first signal has a first portion representative of a first gear feature and a second portion representative of a second gear feature, wherein the first portion occurs above a first magnetic field, and wherein the given threshold is set below the first magnetic field.

6. The apparatus of claim 5, wherein the output module produces an output signal as a function of a difference between the second and reference signals, and wherein when the thresholding module adjusts the first signal by the predetermined amount, the difference between the second and reference signals is maintained above a second threshold.

7. The apparatus of claim 6, wherein the second threshold is approximately equal to the given threshold less the reference signal.

8. The apparatus of claim 1, wherein the first signal has a first portion representative of a first gear feature and a second portion representative of a second gear feature, wherein the second portion occurs below a second magnetic field, and wherein the given threshold is set at or below the second magnetic field.

9. The apparatus of claim 8, wherein the output module produces an output signal as a function of a difference between the second and reference signals, and wherein when the thresholding module adjusts the first signal by the predetermined amount, the difference between the second and reference signals is maintained above a second threshold.

10. The apparatus of claim 9, wherein the second threshold is approximately equal to the given threshold less the reference signal.

11. The apparatus of claim 1, wherein the given threshold is set at a predetermined magnetic field, whereby the thresholding module adjusts the first signal by a predetermined amount when the magnetic sensing element experiences a magnetic field satisfying the given threshold.

12. The apparatus of claim 11, wherein the output module produces an output signal as a function of a difference between the second and reference signals, and wherein when the thresholding module adjusts the first signal by the predetermined amount, the difference between the second and reference signals is maintained above a second threshold.

13. The apparatus of claim 12, wherein the second threshold is approximately equal to the given threshold less the reference signal.

14. An apparatus for detecting gear features, the apparatus comprising:

a magnetic sensing element providing a first signal indicative of the presence of a gear feature;

an amplifier module operable to receive the first signal and responsively provide a second signal;

a detector module operable to detect a first difference between the second signal and a reference signal, and responsively provide a third signal as a function of the first difference;

a feedback module operable to receive the third and reference signals, and responsively adjust the first signal:
 (i) as a function of a second difference between the third and reference signals when the second difference falls below a given threshold; and
 (ii) by a predetermined amount when the second difference satisfies the given threshold; and an output module operable to receive the second and reference signals, and responsively produce an output signal as a function of the second and reference signals.

15. The apparatus of claim 14, wherein the output module produces an output signal as a function of a difference between the second and reference signals, and wherein when the feedback module adjusts the first signal by the predetermined amount, the difference between the second and reference signals is maintained above a second threshold.

16. The apparatus of claim 15, wherein the second threshold is approximately equal to the given threshold less the reference signal.

17. The apparatus of claim 16, wherein the first signal has a first portion representative of a gear tooth and a second portion representative of a gear slot, and wherein the given threshold is chosen such that when the first portion contains an errant portion that indicates a false presence of the gear slot when one is not present, the feedback module adjusts the first signal by the predetermined amount so as to provide to the output module the second and reference signals without the false presence.

18. The apparatus of claim 16, wherein the first signal has a first portion representative of a gear tooth, wherein the first portion occurs above a first magnetic field, and wherein the given threshold is set below the first magnetic field.

19. The apparatus of claim 16, wherein the first signal has a first portion representative of a gear slot, wherein the second portion occurs below a second magnetic field, and wherein the given threshold is set at about the second magnetic field.

20. The apparatus of claim 16, wherein the first signal has a first portion representative of a gear slot, wherein the second portion occurs below a second magnetic field, and wherein the given threshold is set below the second magnetic field.

21. An apparatus for detecting gear features, the apparatus comprising:

a magnetic sensing element providing a plurality of differential signals indicative of the presence of gear features, wherein the plurality of differential signals comprise a first set of differential signals representative of a first gear feature and a second set of differential signals representative of a second gear feature;

an amplifier module operable to receive the plurality of differential signal and responsively provide a second signal;

a peak detector module operable to detect a first difference between the second signal and a reference signal, and responsively provide a third signal as a function of the first difference, wherein the third signal tracks the second set of differential signals and then holds at a peak of the second set of differential signals;

a feedback module operable to receive the third and reference signals, and responsively adjust the plurality of differential signals:
  (i) as a function of a second difference between the third and reference signals when the second difference falls below a given threshold; and
  (ii) by a predetermined amount when the second difference satisfies the given threshold; and an output module for receiving the second and reference signals, wherein the output module responsively produces an output signal as a function of the second and reference signals.

22. The apparatus of claim 21, wherein each differential signal is proportional to a magnetic field.

23. The apparatus of claim 21, wherein each of the plurality of differential signals comprises a high portion and a low portion, wherein the feedback module responsively adjusts the high portion by (i) the second difference when the second difference falls below the given threshold and (ii) the predetermined amount when the second difference satisfies the given threshold.

24. The apparatus of claim 21, wherein the second signal is an inverse function of the plurality of differential signals.

25. The apparatus of claim 21, wherein the first gear feature is a gear tooth and the second gear feature is a gear slot.

* * * * *